United States Patent
Helm

(10) Patent No.: US 6,796,127 B2
(45) Date of Patent: Sep. 28, 2004

(54) ONE CYCLE INTERNAL COMBUSTION ENGINE

(76) Inventor: John F. Helm, 7639 Hardy St., Overland Park, KS (US) 66204-2637

(*) Notice: Subject to any disclaimer, the term of this patent is extended or adjusted under 35 U.S.C. 154(b) by 0 days.

(21) Appl. No.: 10/376,665

(22) Filed: Feb. 28, 2003

(65) Prior Publication Data

US 2004/0040305 A1 Mar. 4, 2004

Related U.S. Application Data

(60) Provisional application No. 60/406,508, filed on Aug. 27, 2002.

(51) Int. Cl.[7] .............................................. F01B 29/04
(52) U.S. Cl. ......................... 60/712; 60/716; 123/61 R; 123/62
(58) Field of Search ................................ 123/61 R, 62, 123/61 V, 63, 25 C, 25 D; 60/712, 716

(56) References Cited

U.S. PATENT DOCUMENTS

| | | | |
|---|---|---|---|
| 1,096,730 A | * 5/1914 | Lake | ......................... 123/25 D |
| 1,531,702 A | 3/1925 | King | |
| 2,295,037 A | 9/1940 | Hedges | |
| 2,559,484 A | 7/1951 | Waring | |
| 2,569,269 A | 9/1951 | Wilkins | |
| 2,671,311 A | 3/1954 | Rohrbach | |
| 2,780,208 A | 2/1957 | Brown | ...................... 123/61 R |
| 2,922,408 A | 1/1958 | Humphries et al. | |
| 3,074,228 A | 1/1963 | Lee | |
| 3,340,855 A | 9/1967 | Brown | |
| 3,340,856 A | 9/1967 | Brown | |
| 4,062,338 A | 12/1977 | Toth | |
| 4,552,106 A | 11/1985 | Spence | |
| 4,627,389 A | 12/1986 | Simon | |
| 4,706,462 A | * 11/1987 | Soltermack | ................... 60/712 |
| 4,945,725 A | * 8/1990 | Carmein et al. | ............... 60/509 |
| 4,976,226 A | 12/1990 | Herman | |
| 5,285,752 A | 2/1994 | Reed et al. | |
| 5,894,820 A | 4/1999 | Baeta | |
| 6,095,100 A | 8/2000 | Hughes | |

OTHER PUBLICATIONS

Article from Popular Science (Mar. 2002), pp. 66–68, (untitled, unauthored).

* cited by examiner

Primary Examiner—Sheldon J Richter
(74) Attorney, Agent, or Firm—Hovey Williams LLP

(57) ABSTRACT

A one cycle internal combustion engine (10) configured for powering a vehicle (V) is disclosed. The engine (10) broadly includes an engine block (12) defining three cylinders (14, 16, and 18), three double-acting pistons (20,22, and 24) slidably received in the corresponding cylinders (14,16,18), respectively, a fuel delivery system (26) for delivering fuel to the cylinders (14,16,18) to drive the pistons (20,22,24), a steam delivery system (28) for delivering steam to the cylinders (14,16,18) to additionally drive the pistons (20, 22,24), a crankshaft (30) rotatably supported by the block (12) and drivingly rotated by the pistons (20,22,24), and a temperature regulation assembly (32) for regulating the temperature within the engine (10). The double-acting pistons (20,22,24) are powered on every stroke. The fuel delivery system (26) delivers diesel fuel to the cylinders (14,16,18) for combustion therein to drive the pistons (20, 22,24). The steam delivery system (28) delivers water to the cylinders (14,16,18) for expansive conversion to steam therein to further drive the pistons (20,22,24). The temperature regulation assembly (32) broadly includes an insulated encasement (130), a lubrication subassembly (132), and a condenser-radiator subassembly (134) that cooperate to enable a continuous, reusable supply of water to the pistons (20,22,24) and control the temperature of the engine (10) to reduce the degradation problems associated with extreme temperature conditions.

27 Claims, 13 Drawing Sheets

ONE CYCLE INTERNAL COMBUSTION ENGINE

RELATED APPLICATIONS

This application claims the benefit of U.S. Provisional Application No. 60/406,508 filed Aug. 27, 2002 and entitled ONE CYCLE INTERNAL COMBUSTION ENGINE which is hereby incorporated herein by reference.

BACKGROUND OF THE INVENTION

1. Field of the Invention

The present invention relates generally to piston engines, such as internal combustion engines. More specifically, the present invention concerns a one cycle internal combustion engine including a double-acting piston that is powered on every stroke. The piston is driven by combusting an organic fuel (e.g., diesel fuel, gasoline, etc.) inside the cylinder and expanding a noncombustible inorganic material (e.g., steam, etc.) inside the cylinder. The combustible organic fuel and the noncombustible inorganic material can be used in isolation to power alternative strokes or may be used in combination to power each stroke. A temperature controlled storage and delivery system on the intake and a neutralizing condenser controlled by a sail switch on the exhaust are also provided by the present invention to enable a continuous, reusable supply of the inorganic material to the piston.

2. Discussion of Prior Art

Internal combustion piston engines are well known in the art for providing power in various applications (e.g., for powering vehicles, mowers, machines, etc.). Internal combustion engines typically combust an organic fuel (e.g., diesel fuel, gasoline, etc.) to power the piston through a power stroke. These engines have traditionally been multi-cycle engines wherein the piston is powered through the down stroke only once during the series of multiple strokes comprising the cycle. For example, two and four cycle engines are prevalent wherein the corresponding cycles include one power stroke for every two and four strokes of the piston, respectively. These intermittent power strokes are designed to minimize the high operating temperatures associated with repeated internal combustion. However, these intermittent power strokes do not provide the desired power output. Accordingly, these prior art engines typically utilize multiple pistons that are conventionally connected to the crank shaft in series and are offset in their firing times according to stroke cycle in order to supply the desired operating power. For example, a four cycle engine will typically include eight pistons timed to fire in series every ninety degrees of crank shaft rotation. Unfortunately, these prior art internal combustion engines are relatively complex in their construction and timing and thus are undesirably large, heavy and part-intensive. Additionally, these engines are undesirably high pollutant.

There are a few internal combustion one cycle engines known in the art, however, none have met with any commercial success. It is believed this is largely attributable to the fact that these prior art one cycle combustion engines are associated with undesirably high operating temperatures and thus the components are particularly susceptible to wear and degradation caused by heat. In addition, these one cycle engines, like the multi-cycle engines described above, are undesirably prone to degradation during start ups, particularly cold start ups.

Steam engines are known in the art, however, they largely fell out of favor with the introduction of the internal combustion engines discussed above. Steam engines do not operate at the higher operating temperatures associated with internal combustion engines, however, they also require undesirably large or numerous pistons to provide the power desired for many current applications such as powered vehicles. There are also a few prior art multi-cycle engines that have utilized steam to "boost" or assist the power stroke provided by internal combustion. However, these prior art engines are problematic and subject to several limitations. For example, a water supply must be provided that is not subject to freezing (or prematurely converting to steam) within the engine and that is separated from any other engine coolant (e.g., antifreeze, oil, etc.) to prevent undesirably damaging the engine components. Prior art steam engines have heretofore been unable to sufficiently, effectively and efficiently prevent the water supply from freezing within the engine. For example, steam was used to "boost" the power stroke of engines that powered certain naval aircraft during the war in order to allow the planes to safely make it back to an aircraft carrier. However, once the steam assist was implemented, the engines would no longer be suitable for reuse.

SUMMARY OF THE INVENTION

The present invention provides an improved one cycle internal combustion engine that does not suffer from the problems and limitations of the prior art engines detailed above. The engine of the present invention includes a double-acting piston that is powered on every stroke. The inventive piston is driven by combusting an organic fuel, preferably diesel fuel, inside the cylinder and expanding a noncombustible inorganic material, preferably steam, inside the cylinder. In a preferred embodiment, the fuel and the steam are used to sequentially power alternative strokes of the piston. In a preferred alternative embodiment, the fuel and steam are used in combination to power each stroke. The preferred embodiment of the inventive engine also includes a temperature controlled storage and delivery system on the intake and a neutralizing condenser controlled by a sail switch on the exhaust that enable a continuous, reusable supply of steam to the piston and greatly reduces the degradation problems associated with cold start ups.

A first aspect of the present invention concerns an engine broadly including a cylinder, a piston slidably received in the cylinder and shiftable in opposite first and second directions, a first power source operable to alternately shift the piston in the first and second directions, and a second power source operable to alternately shift the piston in the first and second directions. The first power source includes a combustible organic fuel and means for combusting the organic fuel inside the cylinder. The second power source includes a noncombustible inorganic material and means for expanding the material inside the cylinder.

A second aspect of the present invention concerns an engine in a powered vehicle for powering the vehicle. The engine broadly includes a cylinder, a piston slidably received in the cylinder and shiftable in opposite first and second directions, a first power source operable to alternately shift the piston in the first and second directions, and a second power source operable to alternately shift the piston in the first and second directions. The first power source includes a combustible organic fuel and means for combusting the organic fuel inside the cylinder. The second power source includes a noncombustible inorganic material and means for expanding the material inside the cylinder.

A third aspect of the present invention concerns a method of using energy to develop mechanical power. The method broadly includes the steps of (a) placing a piston in a cylinder, (b) expanding gas in the cylinder above the piston to drive the piston down the cylinder, and (c) after step (b), expanding gas in the cylinder below the piston to drive the piston up the cylinder. At least one of steps (b) or (c) is performed by utilizing a phase change to create at least some of the expanding gas. At least one of steps (b) or (c) is performed by utilizing a chemical reaction to create at least some of the expanding gas.

A fourth aspect of the present invention concerns an engine broadly including a cylinder, a piston slidably received in the cylinder, a first power source operable to slide the piston, a storage tank in fluid communication with the cylinder, and an insulated box encasing the cylinder, the piston, and the storage tank. The first power source includes a noncombustible inorganic material and means for expanding the material inside the cylinder. The storage tank is operable to store the inorganic material for delivery to the cylinder. The box is formed in major portion of resin.

A fifth aspect of the present invention concerns an engine broadly including a cylinder, a piston slidably received in the cylinder and shiftable in opposite first and second directions, a first power source operable to alternately shift the piston in the first and second directions, a second power source operable to alternately shift the piston in the first and second directions, a storage tank in fluid communication with the cylinder, an insulated box encasing the cylinder, the piston, and the storage tank, and a condenser in fluid communication with the cylinder and being operable to collect substantially all gases exhausted from the cylinder. The first power source includes a combustible organic fuel and means for combusting the organic fuel inside the cylinder. The second power source includes a noncombustible inorganic material and means for expanding the material inside the cylinder. The storage tank is operable to store the inorganic material for delivery to the cylinder. The box is formed in major portion of resin. The cylinder includes a cylinder head and a cylinder foot spaced from the cylinder head, each being operable to generally seal the cylinder. The cylinder presents internal spaced apart first and second chambers defined between the cylinder head and foot. The piston includes a piston head. The piston is shiftable between a first position wherein the piston head is located in the first chamber and a second position wherein the piston head is located in the second chamber. The first power source includes a first injector operable to inject the combustible organic fuel into said first chamber. The first power source is operable to shift the piston from the first position to the second position. The condenser includes a fan operable to cool the gases sufficiently to convert any steam collected back into water. The fan includes a sail switch operable to activate the fan in response to the relevant speed of ambient air flow adjacent the switch. The condenser further includes a filter operable to generally filter impurities from the converted water. The filter includes a neutralizer operable to add a base to the converted water sufficient to neutralize the converted water.

Other aspects and advantages of the present invention will be apparent from the following detailed description of the preferred embodiments and the accompanying drawing figures.

BRIEF DESCRIPTION OF THE DRAWING FIGURES

Preferred embodiments of the invention are described in detail below with reference to the attached drawing figures, wherein.

Figure 12:
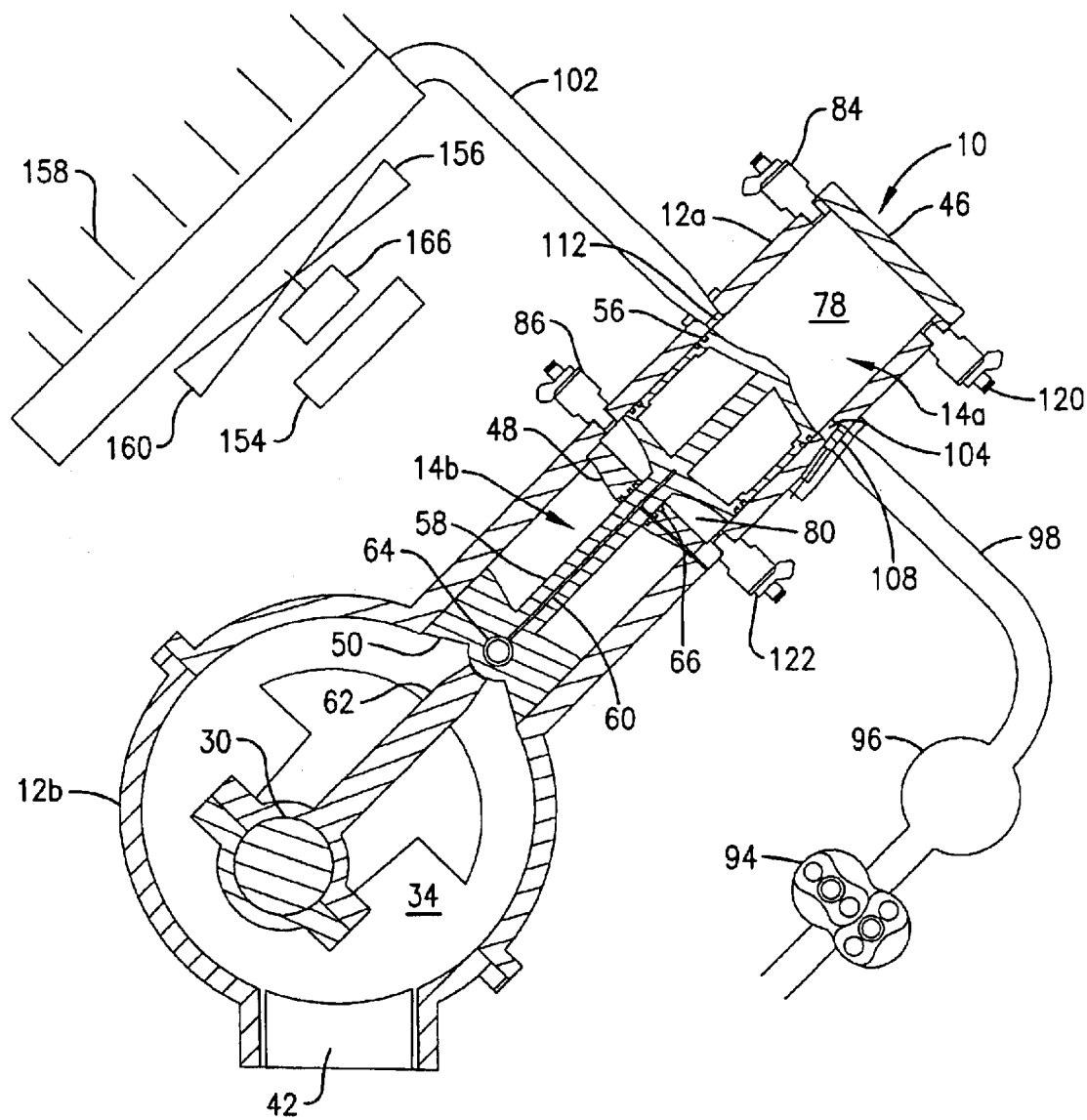
FIG. 12 is a schematic diagram of the engine similar to FIG. 11 illustrating the piston in the bottom dead center position just prior to a fuel compression up stroke with the intake valve in the closed position.
Figure 13:
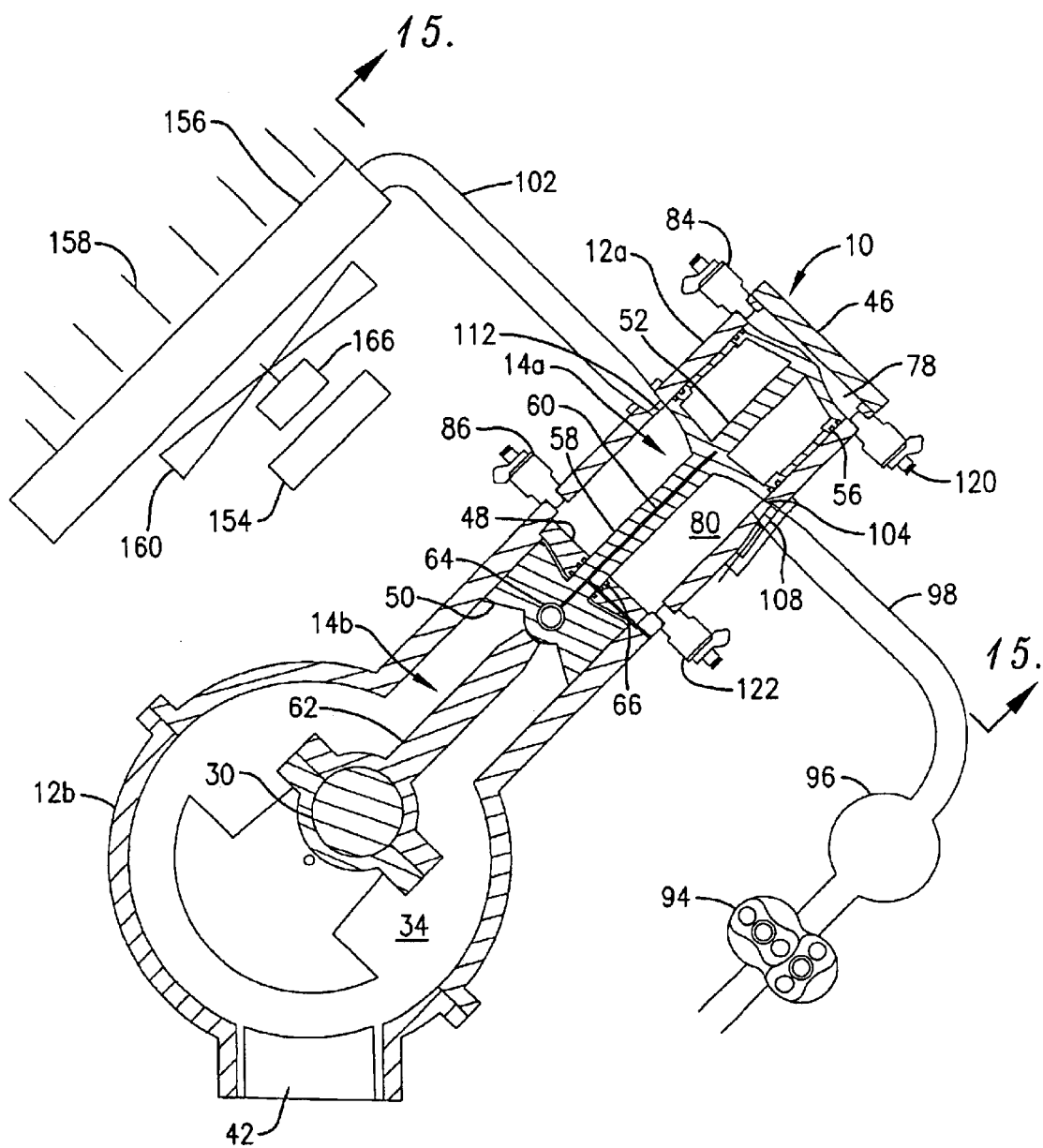
FIG. 13 is a schematic diagram of the engine similar to FIGS. 11 and 12 illustrating the piston in the top dead center position just prior to a steam compression down stroke with the intake valve in the closed position.
Figure 14:
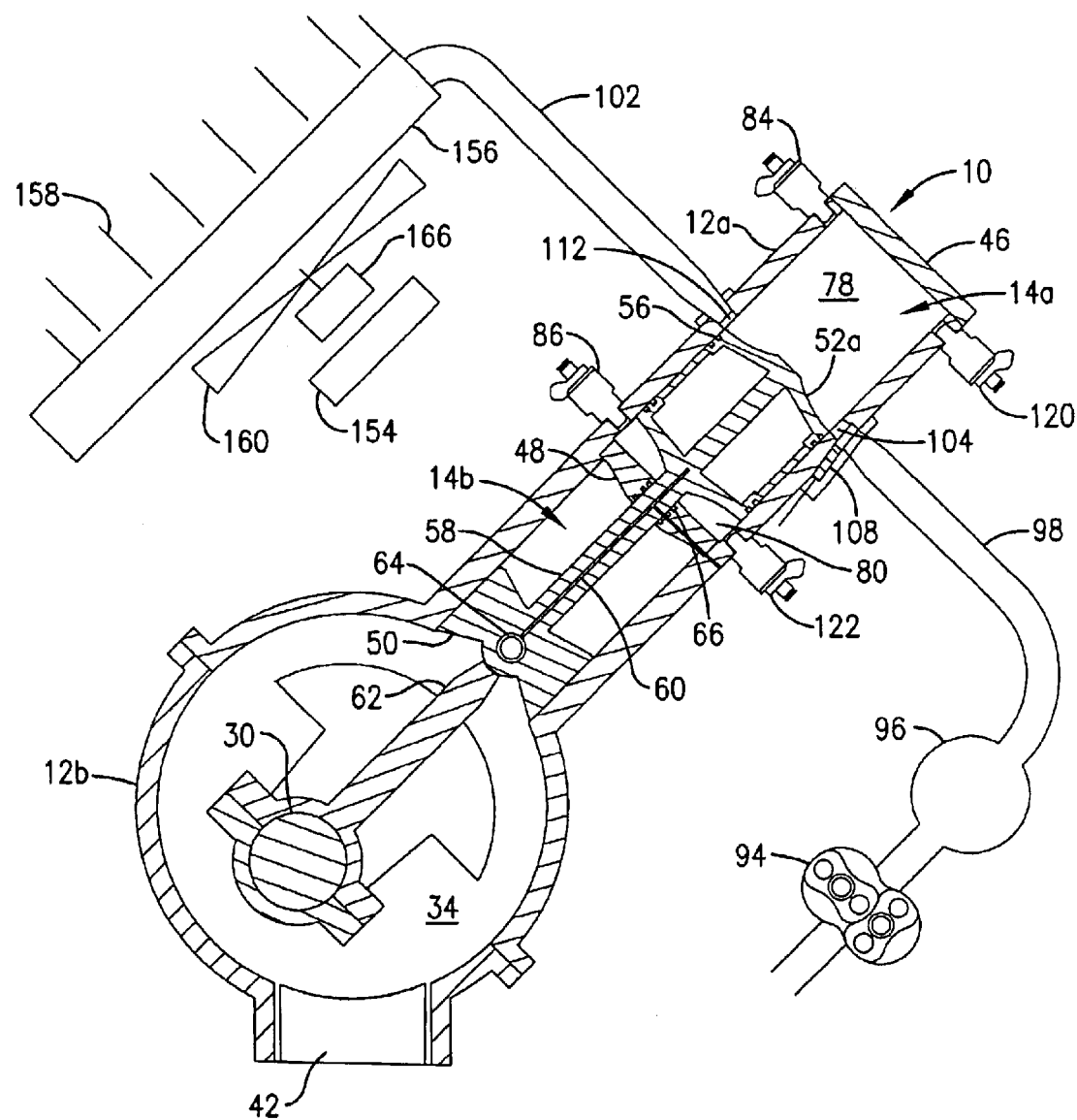
FIG. 14 is a schematic diagram of the engine similar to FIGS. 11–13 illustrating the piston in the bottom dead center position just prior to a steam compression up stroke with the intake valve in the open position.
Figure 15:
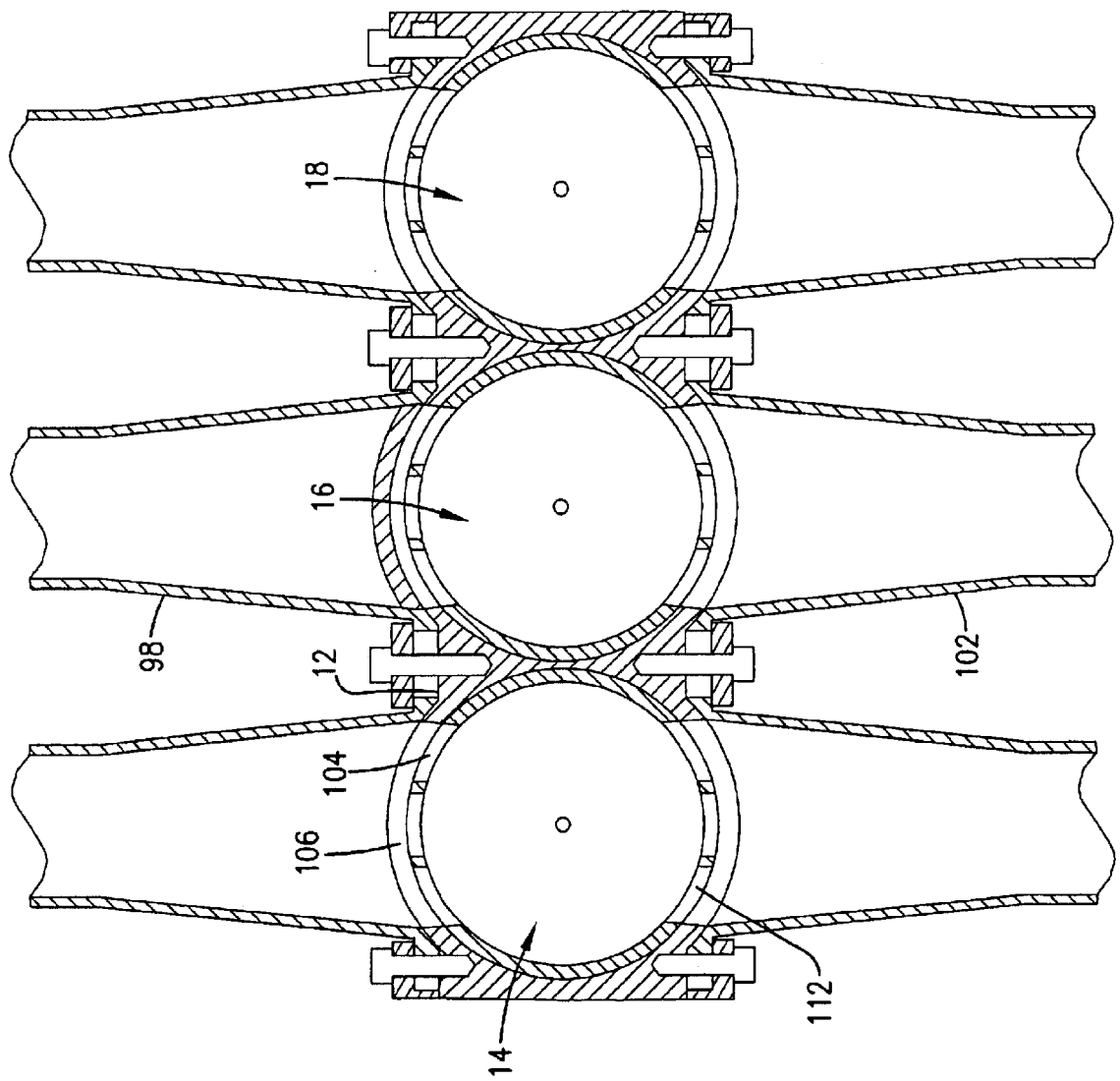
Figure 16:
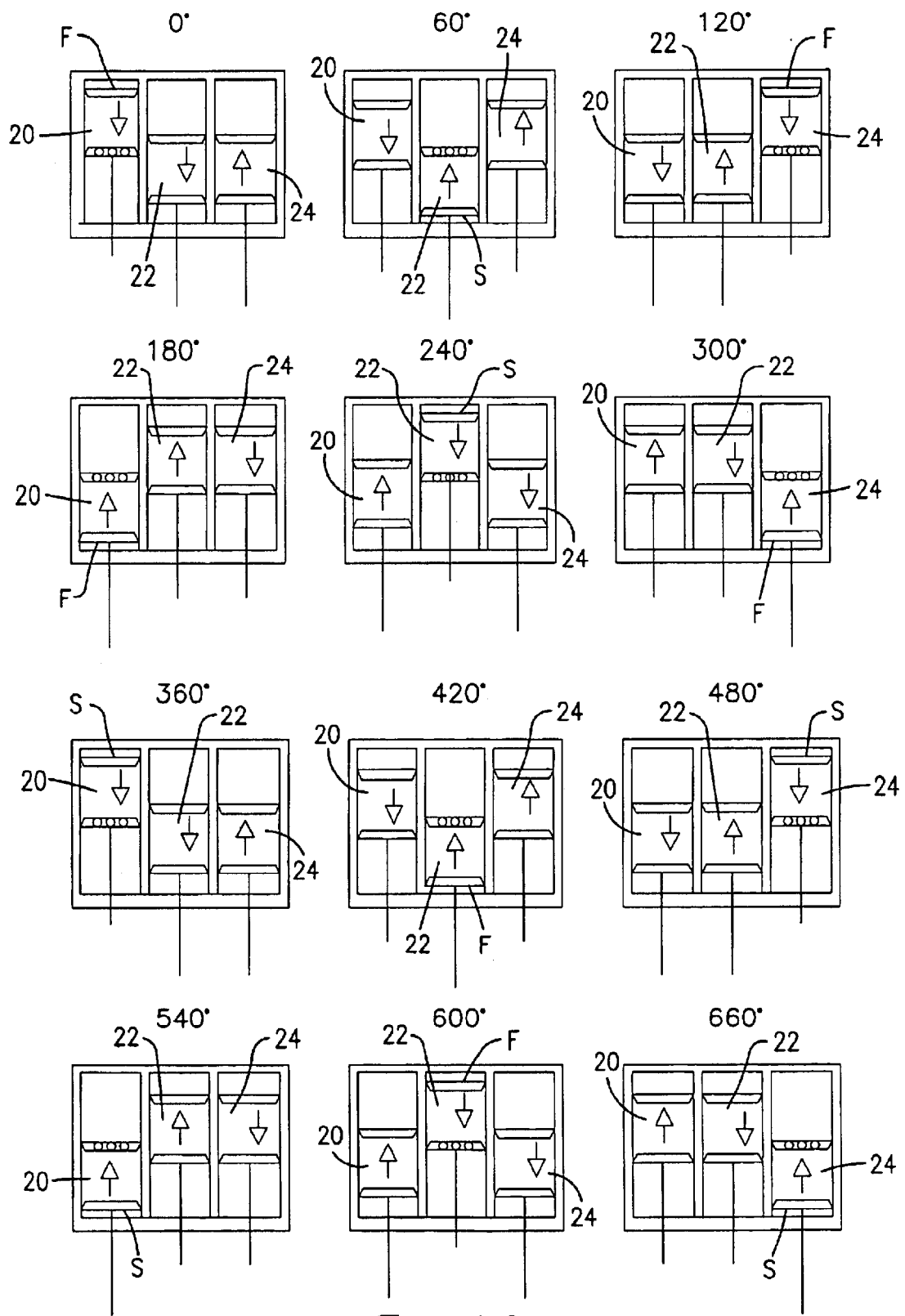

FIG. 15 is a schematic diagram of the engine illustrated in FIGS. 1–14 with the engine block, the intake manifold, and the exhaust manifold shown in section as viewed substantially along line 15—15 of FIG. 13 illustrating the middle intake valve in the closed position and the outer intake valves in the open position; and FIG. 16 is a flow chart diagraming the positional relationship of the three pistons of the engine illustrated in FIGS. 1–15 at every sixty degrees of rotation of the crankshaft through two complete rotations (a twelve stroke progression).

DETAILED DESCRIPTION OF THE PREFERRED EMBODIMENTS

Figure 1:
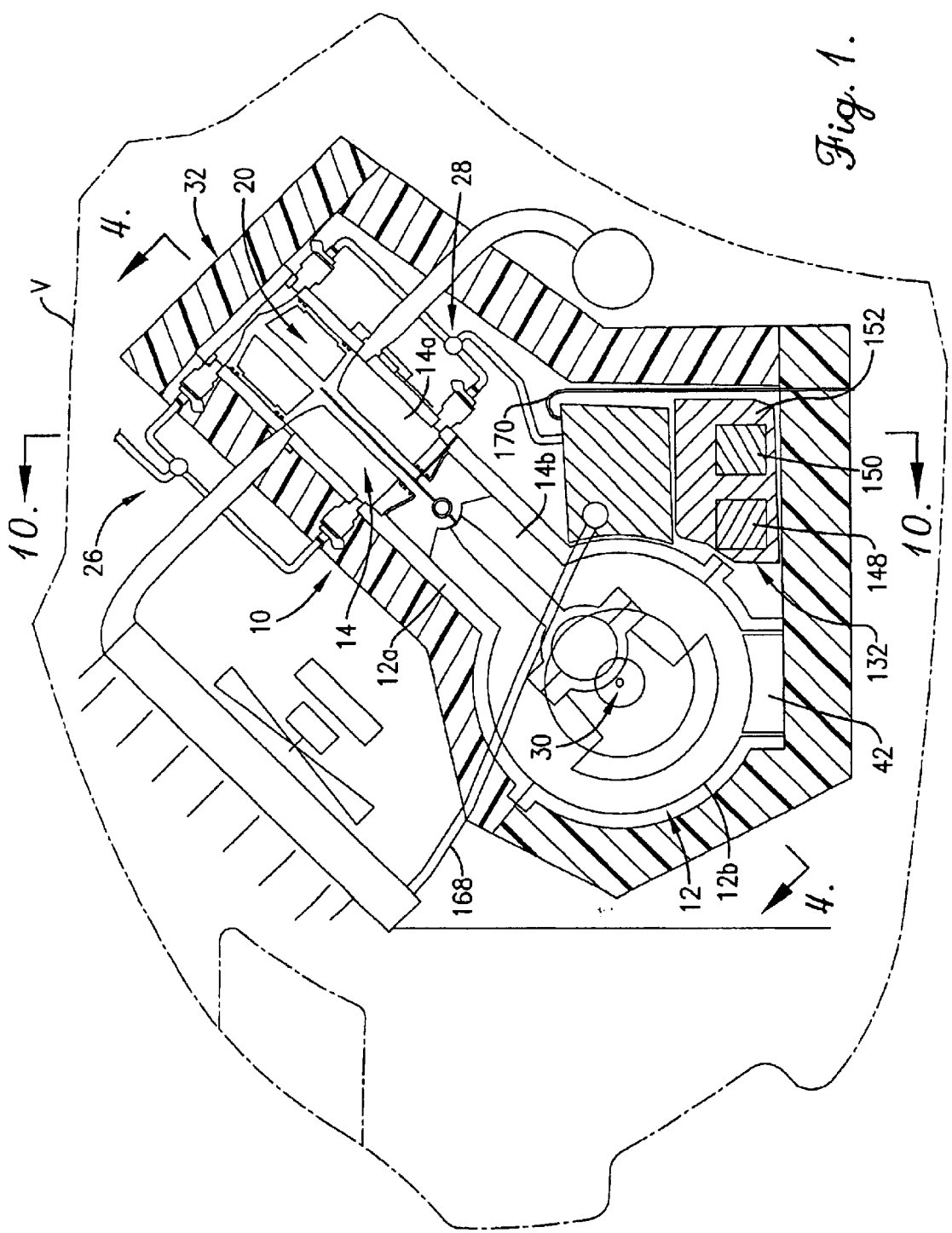
FIG. 1 is a schematic diagram of a one cycle internal combustion engine constructed in accordance with a preferred embodiment of the present invention shown in a vehicle (in fragmentary) and illustrating the insulated encasement, the storage tank, the oil tank, and the heaters in longitudinal section as viewed from the left side.

FIG. 1 illustrates a one cycle internal combustion engine 10 constructed in accordance with the principles of a preferred embodiment of the present invention and configured for powering a vehicle V. Although the illustrated vehicle V is an automobile, the principles of the present invention equally apply to engines for supplying power for virtually any application, such as trucks, boats, machines, etc. As described below, the illustrated engine 10 is a three cylinder engine, however, it is within the ambit of the present invention to utilize any number of cylinders, including a single cylinder configuration. The illustrated engine 10 broadly includes an engine block 12 defining three cylinders 14,16, and 18, three double-acting pistons 20, 22, and 24 slidably received in the corresponding cylinders 14,16,18, respectively, a fuel delivery system 26 for delivering fuel to the cylinders 14,16,18 to drive the pistons 20,22,24, a steam delivery system 28 for delivering steam to the cylinders 14,16,18 to additionally drive the pistons 20,22,24, a crankshaft 30 rotatably supported by the block 12 and drivingly rotated by the pistons 20,22,24, and a temperature regulation assembly 32 for regulating the temperature within the engine 10 (see FIGS. 1–3).

In general, and as further detailed below, the engine 10 is a one cycle engine wherein each of the pistons 20,22,24 is powered on every down stroke as well as on every up stroke. In addition, and as further detailed below, the illustrated engine 10 is a combination internal combustion and steam engine wherein each of the pistons 20,22,24 is driven by a combination of fuel combustion and steam expansion. While the principles of the present invention equally apply to variously configured engines, it is important that the engine include at least one piston and that the piston is powered through every stroke and is operable to be driven by both fuel combustion and steam expansion.

Figure 2:
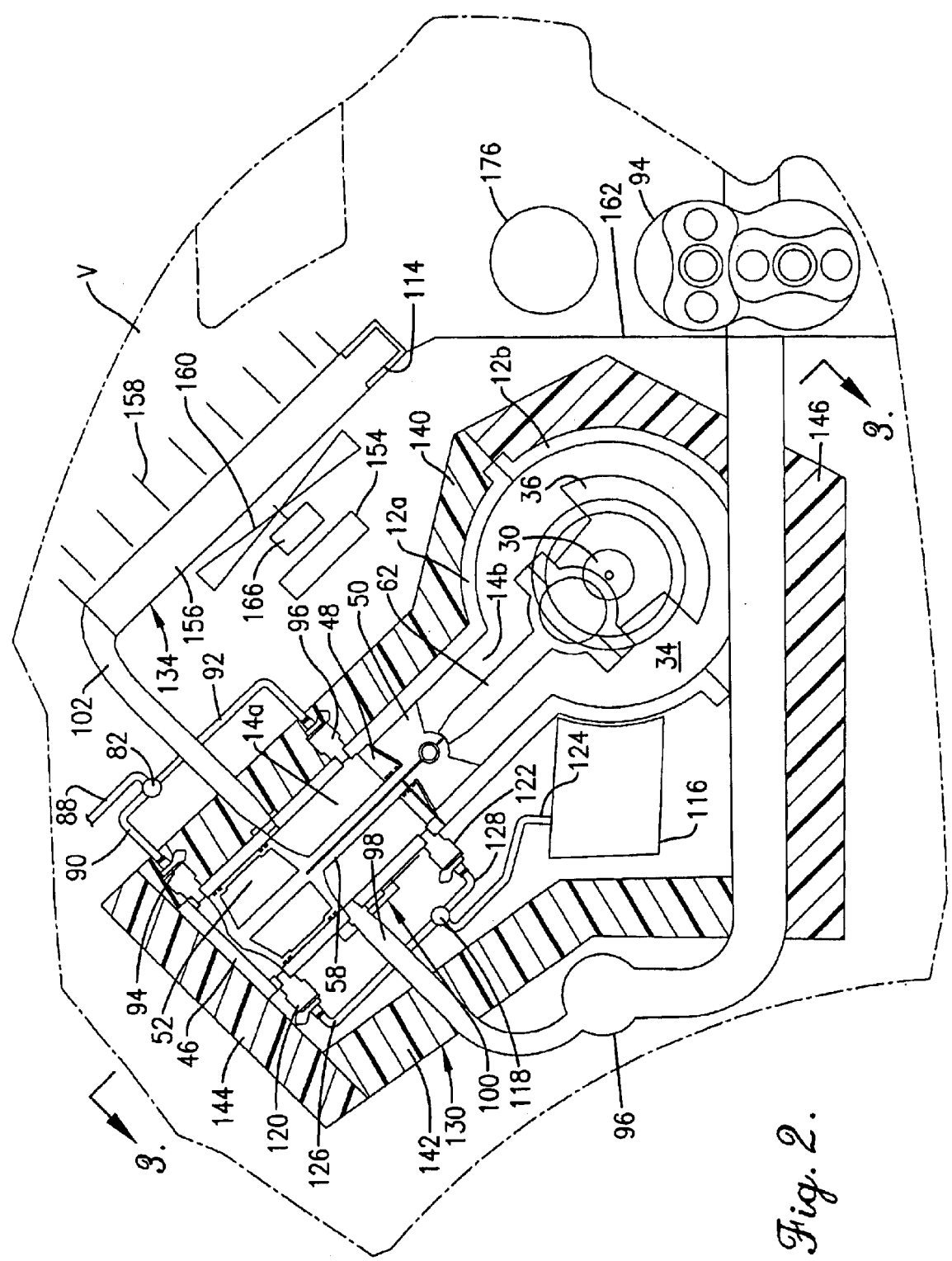
FIG. 2 is a schematic diagram of the engine illustrated in FIG. 1 shown in the vehicle (in fragmentary) with the insulated encasement shown in section as viewed from the right side.
Figure 3:
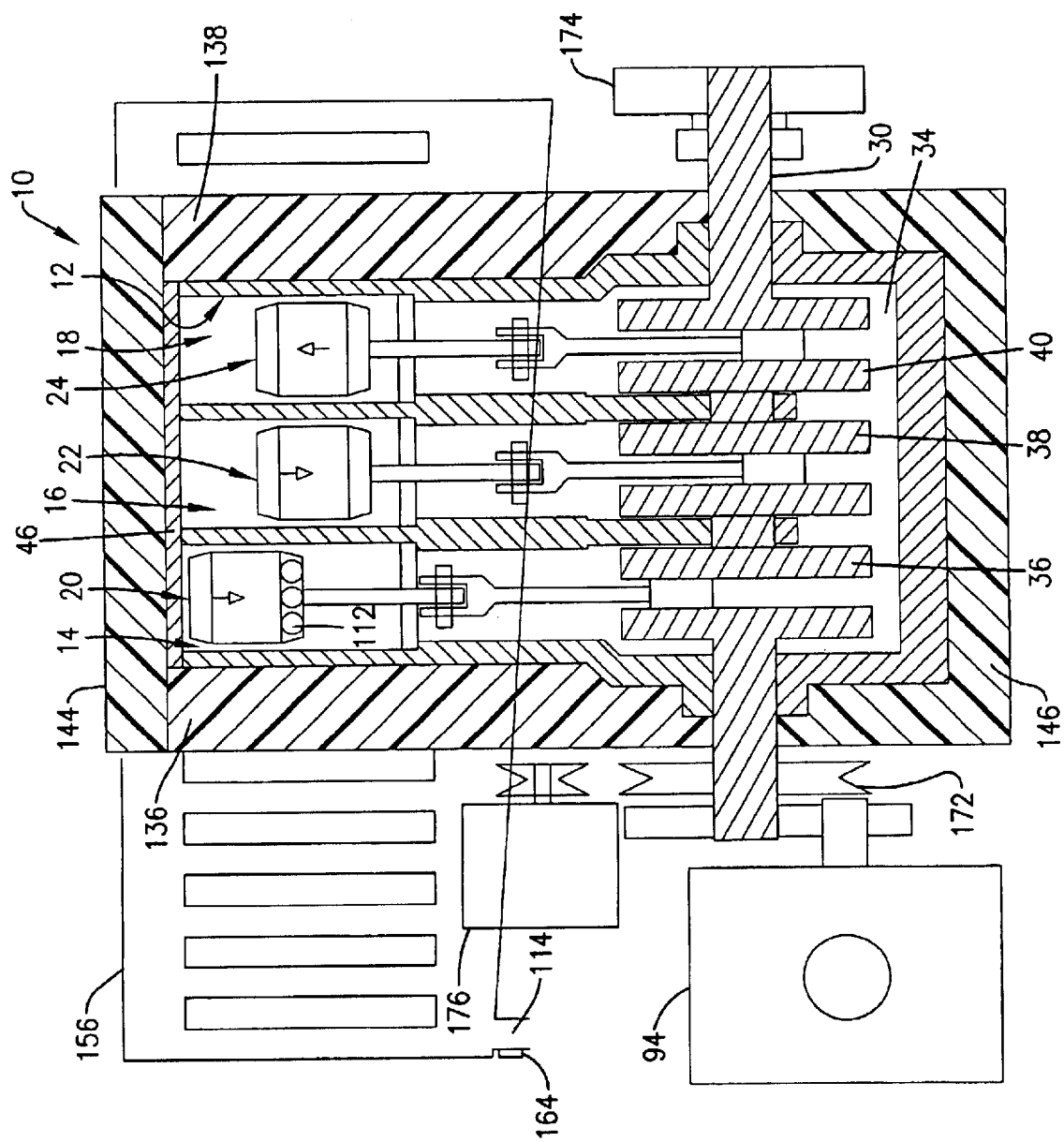
FIG. 3 is a schematic diagram of the engine illustrated in FIGS. 1 and 2 with the insulated encasement, the cylinders, and the drive shaft shown in section as viewed substantially along line 3—3 of FIG. 2.

In more detail, and as shown in FIGS. 1–3, in one manner known in the art, the illustrated engine block 12 includes an upper section 12a and a lower section 12b, each being preferably cast out of a metal or a metal alloy. The upper section 12a is internally bored to define the cylinders 14,16,18 (as detailed below). The lower section 12b is bolted to the upper section 12a and cooperates therewith to define a crankcase 34 below the cylinders 14,16,18 and communicating therewith. The crankcase 34 is configured to rotatably house the crankshaft 30. The crankshaft 30 extends out of either side of the block 12 for rotatably driving various components of the engine 10 as detailed below. In one manner well known in the art, and as will subsequently be described, the illustrated crankshaft 30 includes a plurality of throws 36, 38, and 40 operable to drivingly connect the crankshaft 30 with the pistons 20,22,24. For purposes that will subsequently be described, the lower section 12b further defines an oil sump 42 beneath the crankcase 34 and in fluid communication with the crankcase 34 and at least a portion of the cylinders 14,16,18.

Each of the cylinders 14,16,18 is configured to house the corresponding piston 20,22,24, respectively, for shiftable movement therein. The cylinders 14,16,18 are virtually identically configured and therefore only the cylinder 14 will be described in detail with the understanding that the cylinders 16,18 are similarly constructed. Particularly, the cylinder 14 is generally cylindrically shaped and defines an upper chamber 14a and a lower chamber 14b. The upper chamber 14a defines a diameter greater than the that of the lower chamber 14b. In this manner, a land 44 is defined between the two chambers 14a, 14b (see FIG. 4). For purposes that will subsequently be described, the diameter of the bottom of the upper chamber 14a adjacent the land 44 is slightly less than the diameter of the remainder of the chamber 14a. For example, the illustrated chamber 14a is preferably at least about one-quarter millimeter less in diameter adjacent the land 44. The upper cylinder chamber 14a is sized and dimensioned to closely and concentrically receive the piston 20 therein, yet enable the piston 20 to slide relative to the chamber 14a in response to fuel combustion or steam expansion. Accordingly, the upper chamber 14a is generally sealed with the exception of communication with various engine components as detailed below. In this regard, the upper cylinder chamber 14a is closed at its top end by a bolted on cylinder head 46 that is sealed in any suitable manner (e.g., gaskets, etc.). The bottom end of the chamber 14a is sealed by a cylinder foot 48, as will subsequently be described in detail. The lower cylinder chamber 14b is sized and dimensioned to closely and concentrically receive a sliding bearing 50, as will be further described below. As detailed below, the lower chamber 14b communicates with the crankcase 34 and is sized and dimensioned to enable the linkage components between the piston 20 and the crankshaft 30 (as described below) to reciprocate in the lower chamber 14b.

The pistons 20,22,24 are each double-acting pistons that are slidably received in the corresponding cylinder 14,16,18, respectively, for reciprocating movement therein to drivingly rotate the crankshaft 30. The pistons 20,22,24 are virtually identically configured and therefore only the piston 20 received within the cylinder 14 will be described in detail with the understanding that the pistons 22,24 are similarly constructed. In more detail, the piston 20 includes a double-acting head 52 having opposite, sloped driving surfaces 52a and 52b. The head 52 is a hollow head that is preferably sand cast (e.g., preferably from a metal alloy having a low weight to strength ratio such as titanium, carbon fibers, etc.) and therefore further includes sand core plugs 54, as are known in the art (see FIG. 5). In one manner known in the art, the head 52 further includes a plurality of compression rings 56 that seal the piston head 52 against the inner cylinder wall of the upper cylinder chamber 14a (see FIG. 5). The piston 20 further includes a piston rod 58 integrally formed with the head 52 and extending out of the bottom thereof. The piston rod 58 extends through the cylinder foot 48 and into the lower chamber 14b. For purposes that will subsequently be described, formed in the rod 58 and the head 52 is an oil gallery 60 that communicates the lower cylinder chamber 14b with the upper cylinder chamber 14a.

Figure 4:
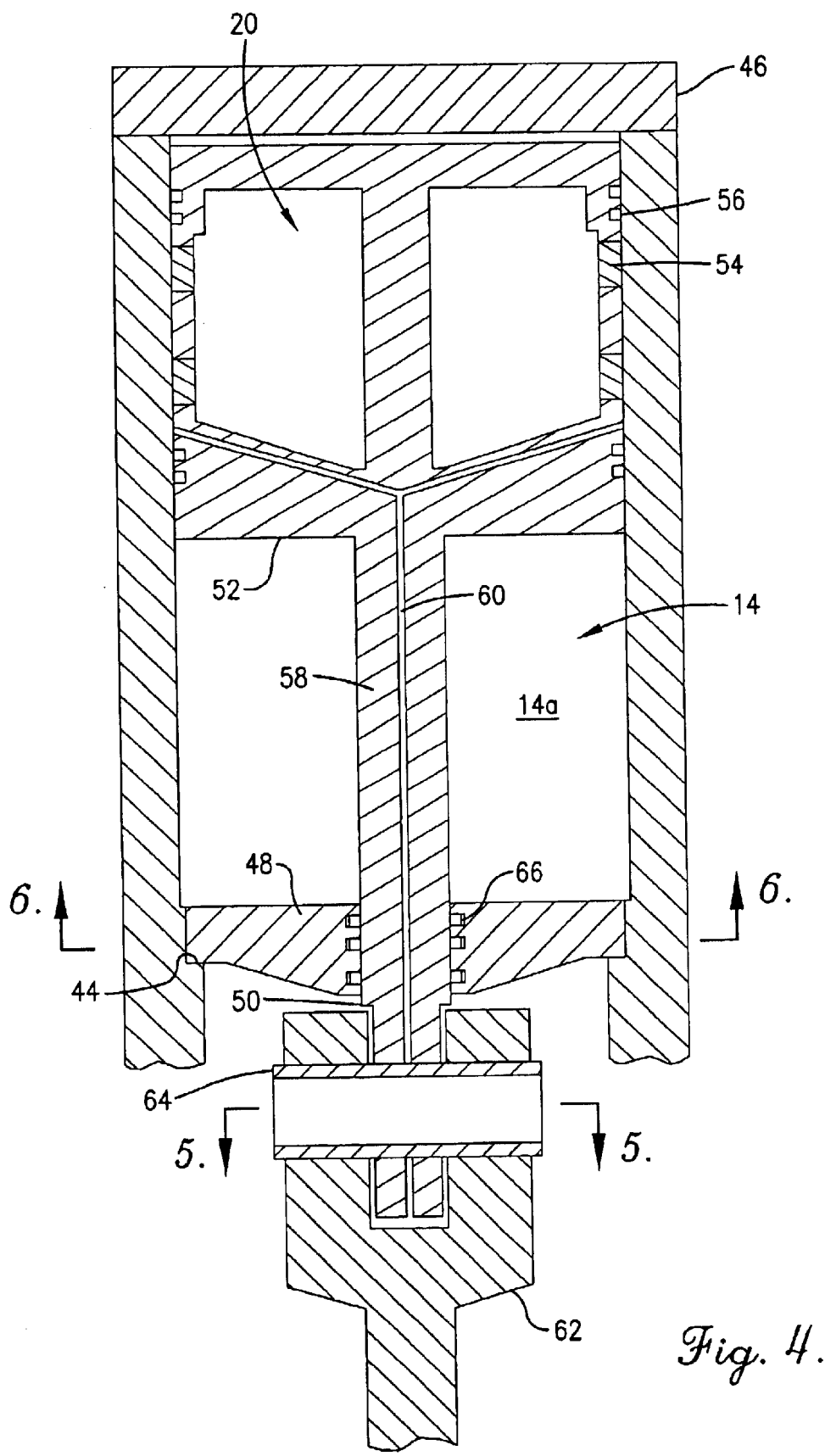
FIG. 4 is a fragmentary longitudinal sectional view of the engine taken substantially along line 4—4 of FIG. 1 and illustrating one of the double-acting pistons coupled to a connecting rod in the cylinder.
Figure 5:
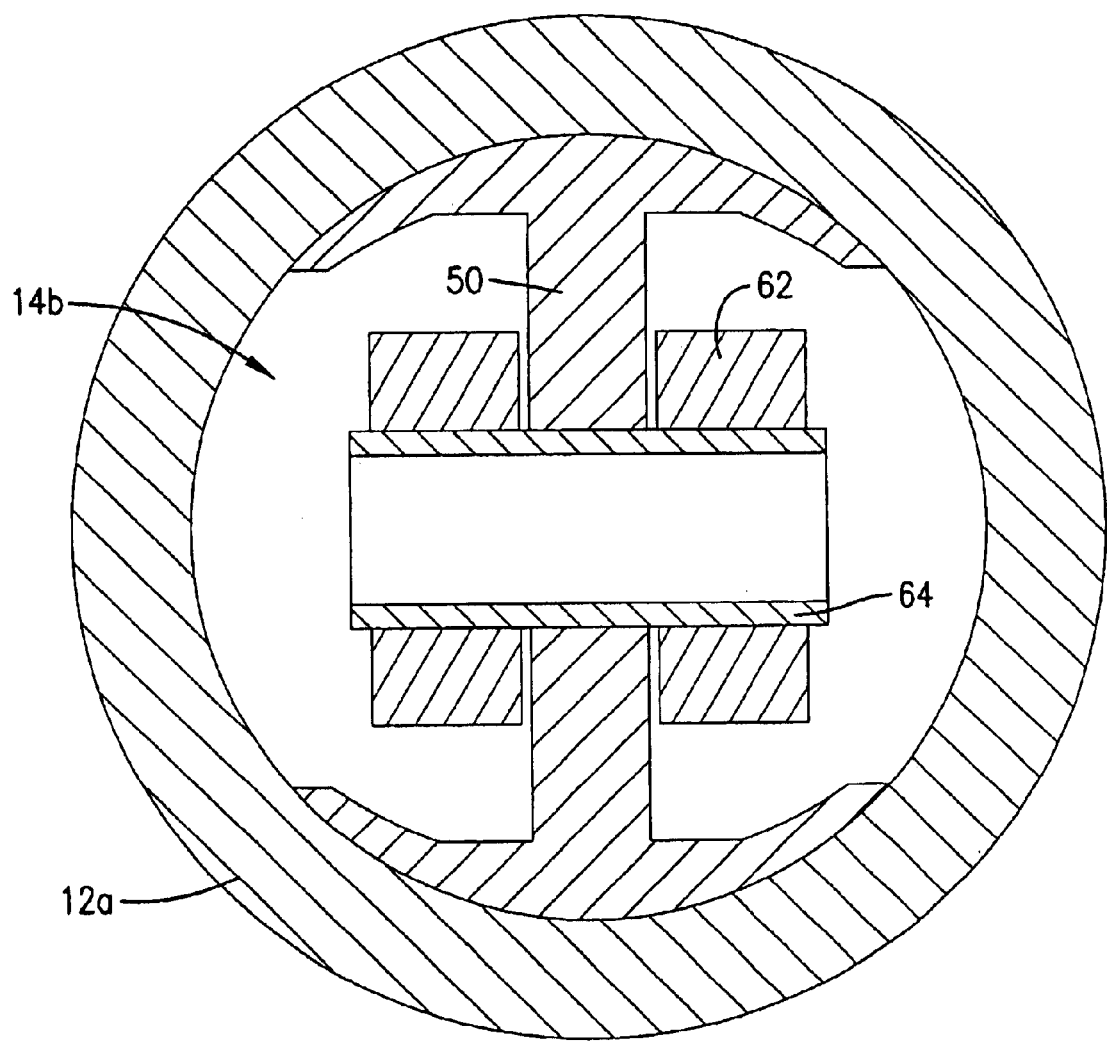
FIG. 5 is a sectional view of the engine taken substantially along line 5—5 of FIG. 4 and illustrating the wrist pin coupling between the piston rod and the connecting rod.
Figure 6:
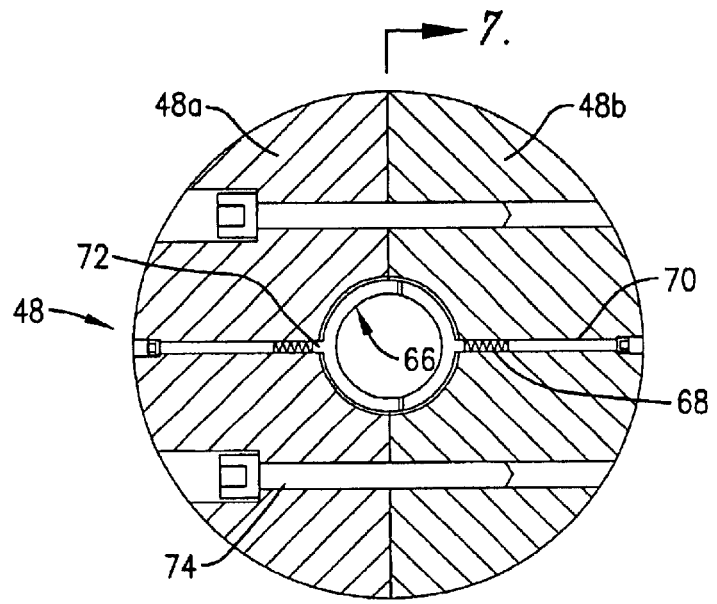
FIG. 6 is a sectional view of the engine taken substantially along line 6—6 of FIG. 4 and illustrating the cylinder foot.
Figure 7:
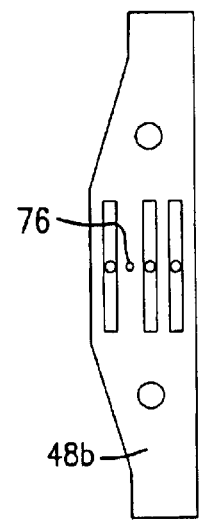
FIG. 7 is a schematic diagram of the cylinder foot illustrated in FIG. 6 as viewed substantially along line 7—7 of FIG. 6.
Figure 8:
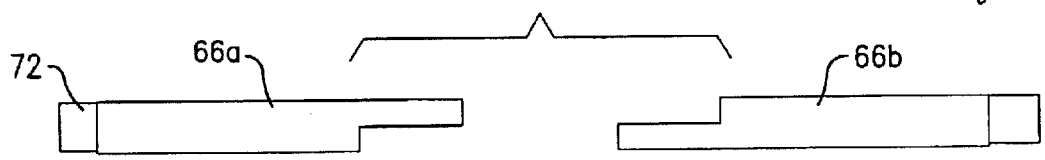
FIG. 8 is a schematic diagram of the foot compression rings illustrated in FIG. 6.
Figure 9:
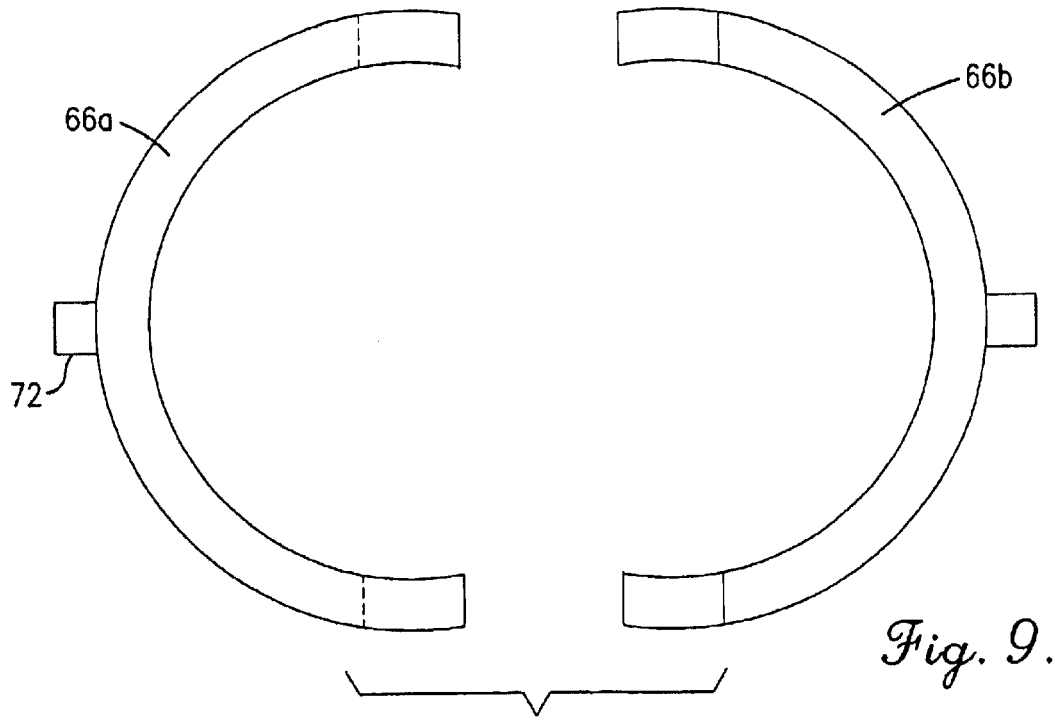
FIG. 9 is a schematic diagram of the foot compression rings illustrated in FIGS. 6 and 8.
Figure 10:
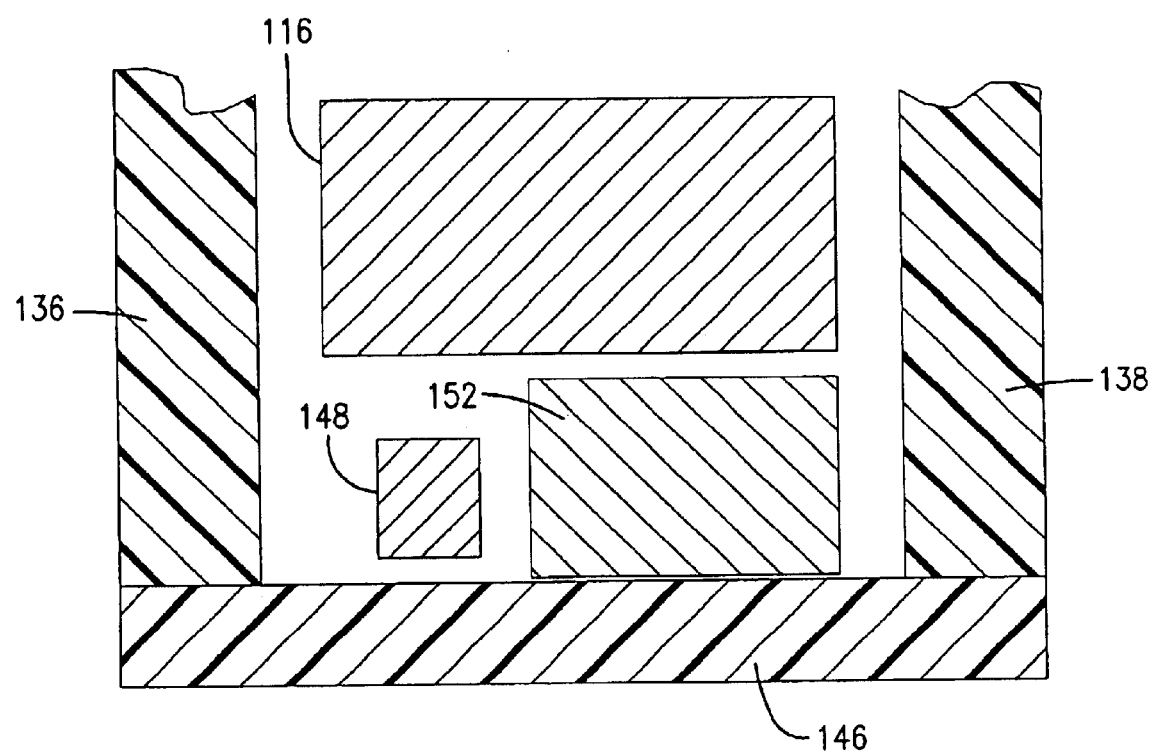
FIG. 10 is a schematic diagram of the engine illustrated in FIGS. 1–9 illustrating the insulated encasement (in fragmentary), the storage tank, the oil tank, and one of the heaters in section as viewed substantially along line 10—10 of FIG. 1.

As will be further described below, the piston 20 is reciprocated to drivingly rotate the crankshaft 30. In this regard, and as shown in FIGS. 4 and 5, the piston 20 is drivingly linked to the crankshaft 30 by a connecting rod 62. Particularly, in one manner known in the art, the piston rod 58 is drivingly and pivotally connected to one end of the connecting rod 62 by a wrist pin 64. The other end of the connecting rod 62 is drivingly and pivotally connected to the throw 36 (see FIG. 3). In this manner, when the piston 20 is caused to shift, the reciprocating movement is transferred through the connecting rod 62 to cause the crankshaft 30 to rotate. In one manner known in the art, the transferred movement of the piston rod 58 and the connecting rod 62 is guided and stabilized by the sliding bearing 50. Particularly, the wrist pin 64 is press fit into the sliding bearing 50 (see FIG. 7). As shown in FIG. 7, the sliding bearing 50 is sized and configured to slidingly engage the inner wall of the lower cylinder chamber 14b as it reciprocates with the piston rod 58 and the connecting rod 62 (see also FIGS. 11–14).

Turning now to FIGS. 4–9, as previously indicated, the piston rod 58 extends through the cylinder foot 48. However, the cylinder foot 48 must seal the upper cylinder chamber 14a while still enabling the piston rod 58 to reciprocate therein. In this regard, the cylinder foot 48 includes a plurality of compression rings 66 that seal around the piston rod 58 yet still enable the rod 58 to slide relative to the rings 66. For manufacturing purposes, the rings 66 are each formed of two overlapping sections 66a and 66b that complementally intermesh when assembled in the foot 48 (see FIGS. 8 and 9). The compression of the rings 66 is provided by springs 68 that are loaded by screws 70. Positioning and alignment of the rings 66 is provided by index pins 72. To facilitate assembly of the rings 66, the cylinder foot 48 is formed of two sections 48a and 48b that are bolted together around the piston rod 58 during assembly by bolts 74. Once the foot 48 is assembled around the piston rod 58, the foot 48 is press fit into the bottom of the upper cylinder chamber 14a onto the land 44. The press fit is provided by the previously described smaller diameter portion of the upper chamber 14a. To facilitate assembly of the cylinder foot 48 into the chamber 14a, it may be desirable to super cool the foot 48 (e.g., with liquid nitrogen, etc.) prior to press fitting the foot 48 in place. Lubrication of the engagement of the rod 58 with the rings 66 is provided by an oil gallery 76, similar to the oil gallery 60 as described below.

Figure 11:
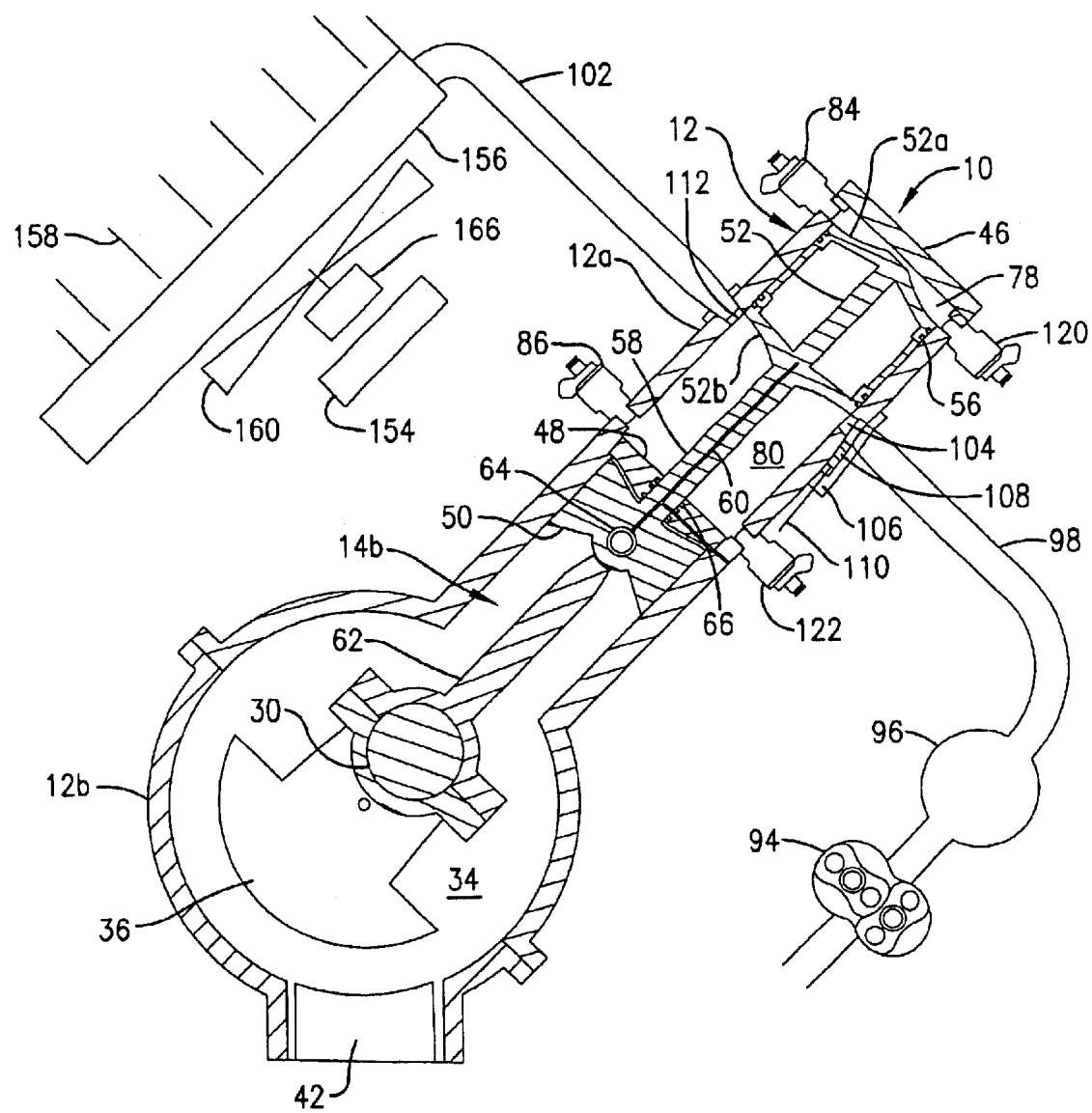
FIG. 11 is a schematic diagram of the engine illustrated in FIGS. 1–10 with portions removed and one of the cylinders (and components therein) shown in section to illustrate the corresponding double-acting piston in the top dead center position just prior to a fuel compression down stroke with the intake valve in the open position.

Turning now to FIGS. 11–14, the piston 20 reciprocates in the upper cylinder chamber 14a to define two variable displacement combustion chambers 78 and 80 therein. The upper variable displacement combustion chamber 78 is defined in the upper cylinder chamber 14a by the top sloped surface 52a of the piston head 52 and the cylinder head 46. The lower variable displacement combustion chamber 80 is defined in the upper cylinder chamber 14a by the bottom sloped surface 52b of the piston head 52 and the cylinder foot 48. These displacement chambers 78,80 are variable because as the piston head 52 shifts, the volume of the chambers 78,80 complementally change. In this regard, the piston head 52 shifts relative to the cylinder 14 between a top dead center (TDC) position as shown in FIGS. 11 and 13 and a bottom dead center (BDC) position as shown in FIGS. 12 and 14. As subsequently described in detail, the piston 20 reciprocates between the TDC and BDC positions to rotate the crankshaft 30. As detailed below, the variable displacement chambers 78,80 cooperate with the delivery systems 26,28 to reciprocate the piston 20 to thereby power the engine 10.

Returning now to FIGS. 1–3, the fuel delivery system 26 delivers fuel to the variable displacement chambers 78,80 for combustion therein to cause the piston 20 to reciprocate. The illustrated fuel delivery system 26 is an internal combustion diesel fuel system, however, as described below, the fuel deliver system could be configured to deliver various types of internally combusting fuel other than diesel fuel. The fuel delivery system 26 is described in detail with respect to the cylinder 14 and the piston 20. However, it should be understood that the system 26 operates in a similar manner with respect to the cylinders 16,18 and the pistons 22,24 and utilizes common components or similar additional components where appropriate. The illustrated fuel delivery system 26 broadly includes a fuel tank (not shown), a common fuel rail 82, and fuel injectors 84 and 86. In more detail, in one manner well known in the art, the diesel fuel is stored in the fuel tank in the vehicle V remote from the other components of the engine 10 and is pumped through a fuel supply line 88 to the rest of the components of the system 26. Particularly, the diesel fuel is pumped through the supply line 88 to the common fuel rail 82 positioned adjacent the cylinder 14. The common rail 82 is a reservoir operable to store the diesel fuel under pressure (e.g., about 20,000 psi or higher) and deliver the fuel under pressure to the injectors 84 and 86 through corresponding high pressure lines 90 and 92, respectively. Although relatively new in the art, common rails are known and available from a variety of manufacturers including for example Robert Bosch. When the engine 10 requires fuel for combustion (as detailed below), the pressurized fuel from the common rail 82 is delivered under pressure by a high pressure pump (not shown) directly to the injectors 84,86. The injectors 84,86 receive the high pressure fuel from the common rail 82 and selectively and alternately inject the fuel into the combustion chambers 78,80. Particularly, each of the injectors 84,86 preferably distribute fuel into the combustion chambers 78,80 at a relatively high rate per combustion stroke, for example about five times per stroke. One suitable fuel injector is a piezoactuator injector available from Siemens. The injectors 84,86 are timed and controlled, in any suitable manner known in the art, to deliver the fuel in accordance with the operation of the engine 10 as detailed below. The high pressure common rail 82 and the high pressure and high speed injectors 84,86 prevent the fuel from prematurely vaporizing and enable a thorough burn of the fuel inside the cylinder 14.

As detailed below, air is selectively and alternately introduced into the variable displacement combustion chambers 78,80 and compressed by the piston head 52 as it shifts into the TDC and/or BDC positions. Once air has been compressed in the upper chamber 78 (i.e., the piston head 52 is in the TDC position), the upper injector 84 injects pressurized fuel into the compressed air in the chamber 78 wherein the heat of the compressed air lights the fuel initiating instant combustion. When the fuel/air mixture combusts, the expansion forces generated thereby drive the piston head 52 from the TDC position down into the BDC position. As the piston 20 shifts into the BDC position, the movement of the piston 20 causes the crankshaft 30 to rotate. As the piston head 52 shifts into the BDC position, the air in the lower chamber 80 is compressed. Once the piston head 52 reaches the BDC position, the lower injector 86 injects pressurized fuel into the compressed air in the chamber 80 and the combustion process initiates causing the piston head 52 to shift back into the TDC position. As the piston 20 shifts back into the TDC position, the movement of the piston 20 causes the crankshaft 30 to further rotate. In this manner, each stroke of the piston 20 is a power stroke. This process is repeated causing the piston 20 to reciprocate thus driving the crankshaft 30. This process is supplemented with the steam delivery system 28 as described below and cooperates with similar processes occurring in the cylinders 16,18 to further drive the crankshaft 30 through a range of various speeds suitable for virtually all applications of the vehicle V. However, it is within the ambit of the present invention to utilize various alternative configurations for the fuel delivery system. For example, if diesel fuel is utilized, although less preferred than the common rail direct injection system described, glow plugs could be utilized with an indirect injection system. Additionally, the fuel delivery system could be configured to deliver gasoline to the cylinders, although other components of the engine would need to be modified or added to be compatible with combusting gasoline (e.g., spark plugs, a solenoid valve, means of controlling the fuel/oxygen ratio, etc.). It is important, however, that the fuel delivery system deliver some type of organic combustible fuel to the cylinders for combustion therein.

As previously indicated, the engine 10 is configured to selectively and alternately introduce air into the variable displacement combustion chambers 78,80 for compression by the piston head 52 as well as scavenging spent gases as will be detailed below. In more detail, and perhaps as shown in FIGS. 11–15, the engine 10 includes a compressor 94, an accumulator 96, an intake manifold 98, an intake valve 100, and an exhaust manifold 102. These components will be described in detail with respect to the cylinder 14 and the piston 20, however, it should be understood that the components operate in a similar manner with respect to the cylinders 16,18 and the pistons 22,24 and include, for example, similar intake valves in communication with the cylinders 16,18. The compressor 94 is a positive displacement air compressor in fluid communication with the ambient atmosphere and the intake manifold 98. The compressor 94 takes in fresh air from the atmosphere, compresses it, and delivers the compressed air to the intake manifold 98. In one manner known in the art, the illustrated compressor 94 is belt driven by a pulley 94a fixed to one end of the crankshaft 30 (see FIG. 3). However, any suitable positive displacement compressor configured for these purposes will suffice. In one manner known in the art, the accumulator 96 is fluidly displaced between the compressor 94 and the intake manifold 98 and is operable to store a sufficient supply of compressed air to supply the needs of the intake manifold 98 as detailed below. The intake manifold 98 delivers the compressed air to the cylinder 14 through an intake port 104 when demanded by the engine 10.

In this regard, the intake valve 100 is associated with the intake port 104 for controlling air supplied there through. Particularly, the intake valve 100 is a simple slide gate valve that includes a flow through valve housing 106 over the intake port 104, a valve stop 108 that slides relative to the housing 106 to block the flow through, and a valve guide 110 that controls shifting of the valve stop 108. The valve stop 108 shifts between an open position as shown in FIGS. 11 and 14 and a closed position as shown in FIGS. 12 and 13. When the valve stop 108 is in the open position, compressed air from the accumulator 96 is drawn through the intake port 104 into the upper cylinder chamber 14a. When the valve stop 108 is in the closed position, compressed air is prevented from flowing into the chamber 14a. The illustrated valve guide 110 is a rigid rod that can be timed with the engine 10 and controlled by any suitable means known in the art (e.g., mechanical means such as a cam shaft driven by a timing chain, electronic means such as an embedded microcontroller with sensors, etc.). As further described below, depending on the positioning of the piston head 52, the intake valve 100 delivers air either into the upper combustion chamber 78 for compression therein or to the lower combustion chamber 80 for compression therein. For purposes that will subsequently be described, when air is introduced into the chambers 78,80, the air scavenges spent gases out of the chambers 78,80 and directs the spent gases into the exhaust manifold 102. In this regard, the exhaust manifold 102 includes an exhaust port 112 that communicates the upper chamber 14a with the exhaust manifold 102. As will be subsequently described in detail, the exhaust manifold 102 delivers the spent gases to downstream components for recycling and recirculation into the steam delivery system 28. Any spent gases that cannot be recycled are exhausted to the atmosphere through an outlet tail pipe 114 (see FIG. 3).

As indicated above, in the illustrated engine 10, the internal combustion used to drive the piston 20 as previously described is supplemented with steam power that both drives the piston 14 as well as facilitates controlling the operating temperature of the engine 10. In this regard, the steam delivery system 28 delivers steam to the cylinder 14 for powering and cooling the engine 10. The steam delivery system 28 is described in detail with respect to the cylinder 14 and the piston 20. However, it should be understood that the system 28 operates in a similar manner with respect to the cylinders 16,18 and the pistons 22,24 and utilizes common components or similar additional components where appropriate. The illustrated steam delivery system 28 broadly includes a water tank 116, a common water rail 118, and water injectors 120 and 122. In more detail, for purposes that will subsequently be described, a supply of water is stored in the water tank 116 adjacent the engine block 12 and is pumped under pressure through a water supply line 124 to the common water rail 118. The common water rail 118 is similar to the common fuel rail 82 described above and defines a reservoir operable to store the water under sufficient pressure to prevent the water from prematurely boiling and deliver the water under pressure to the water injectors 120 and 122 through corresponding high pressure lines 126 and 128, respectively. When the engine 10 requires water for steam expansion (as detailed below), the pressurized water from the common rail 118 is delivered under pressure by a high pressure pump (not shown) directly to the injectors 120,122. The injectors 120,122 receive the high pressure water from the common rail 118 and selectively and alternately inject the water into the variable displacement chambers 78,80. Preferably, each of the injectors 120,122 is similar to the previously described fuel injector 84,86, but configured to distribute water into the displacement chambers 78,80 under pressure and at a relatively high rate per stroke. The injectors 120,122 are timed and controlled, in any suitable manner known in the art, to deliver the water in accordance with the operation of the engine 10 as detailed below. However, it is important that the injectors 120,122 be controlled so that they only inject water into the cylinder 14 once the cylinder 14 has reached a temperature sufficient to enable a generally complete conversion to steam.

The water injectors 120,122 inject the pressurized water into the corresponding displacement chambers 78,80 wherein the heat in the chambers 78,80 causes the pressurized water to rapidly and expansively convert into steam thereby shifting the piston 20 between the TDC and BDC positions. As detailed below, the heat sufficient to convert the injected water to steam is provided by the previous internal combustion in the chambers 78,80 heating the chambers 78,80 as well as the piston surfaces 52a, 52b. Once the upper chamber 78 is sufficiently hot and the piston head 52 is shifting toward the TDC position, the upper water injector 120 streams pressurized water into the hot chamber 78 wherein contact with the hot sloped surface 52a of the piston head 52 causes the rapid and expansive conversion to steam. The instantaneously expands and these expansion forces generated thereby drive the piston head 52 from the TDC position down into the BDC position. As the piston 20 shifts into the BDC position, the movement of the piston 20 causes the crankshaft 30 to rotate. Additionally, the conversion of the water to steam also absorbs heat from the chamber 78 thereby facilitating cooling of the chamber 78. As the piston head 52 shifts into the BDC position and the lower chamber 80 is sufficiently hot, the lower injector 122 streams pressurized water into the hot chamber 80 wherein contact with the hot sloped surface 52b initiates the steam expansion causing the piston head 52 to shift back into the TDC position. As the piston 20 shifts back into the TDC position, the movement of the piston 20 causes the crankshaft 30 to further rotate. Additionally, the steam expansion cools the chamber 80. The illustrated injectors 120,122 are preferably oriented at an angle relative to the cylinder 14 so that the hot surface area on the piston head 52 that the injected water streams onto changes as the piston head 52 shifts, thus facilitating a more rapid conversion. However, it is within the ambit of the present invention to utilize various alternative configurations for the steam delivery system. It is important, however, that the steam delivery system deliver some type of noncombustible inorganic material to the cylinders for heat-absorbing expansion therein.

As indicated above, the steam power supplements the piston-driving power provided by internal combustion detailed above. In this regard, and as shown in FIGS. 11–14, the illustrated engine 10 preferably alternates between internal combustion and steam every other down stroke and every other up stroke. In this manner, every stroke is a power stroke, yet the operating temperature of the engine 10 is desirably minimized. In more detail, FIG. 11 illustrates the piston 20 in the TDC position just prior to a fuel powered down stroke followed by a fuel powered up stroke. In this regard, the upper chamber 78 is filled with already compressed air and the intake valve 100 is in the open position to allow compressed air to be drawn into the lower chamber 80. The injector 84 then injects fuel into the upper chamber 78 wherein combustion then drives the piston head 52 down into the BDC position as shown in FIG. 12. In FIG. 12, the piston 20 is illustrated in the BDC position just prior to a fuel powered up stroke followed by a steam powered down stroke. As the piston head 52 shifted to the BDC position, the air in the chamber 80 was compressed and the intake valve 100 is in the closed position preventing any compressed air from being drawn into the upper chamber 78. The injector 86 then injects fuel into the lower chamber 80 wherein combustion then drives the piston head 52 up into the TDC position as shown in FIG. 13.

In FIG. 13, the piston 20 is illustrated in the TDC position just prior to a steam powered down stroke followed by a steam powered up stroke. The upper chamber 78 and the piston surface 52a are hot from the just prior combustion therein, the chamber 78 does not contain compressed air, and the valve 100 is in the closed position to prevent any compressed air form being drawn into the lower chamber 78. As the piston head 52 is shifting toward the TDC position, the upper water injector 120 streams water into the chamber 78 and onto the piston surface 52a wherein it rapidly and expansively converts to steam driving the piston head 52 down into the BDC position as shown in FIG. 14. In FIG. 14, the piston 20 is illustrated in the BDC position just prior to a steam powered up stroke followed by a fuel powered down stroke. The lower chamber 80 and the piston surface 52b are hot from the just prior combustion therein, the chamber 80 does not contain compressed air, and the valve 100 is in the open position to allow compressed air to be drawn into the upper chamber 78. As the piston head 52 is shifting toward the BDC position, the lower water injector 122 streams water into the chamber 80 and onto the piston surface 52b wherein it rapidly and expansively converts to steam driving the piston head 52 up into the TDC position as shown in FIG. 11.

When the compressed air is drawn into the upper chamber 78, it scavenges the steam from the just prior steam expansion out of the chamber 78 and through the exhaust port 112 into the exhaust manifold 102. In a similar manner, when compressed air is drawn into the lower chamber 80 after a steam powered stroke, it scavenges the steam from the chamber 80 into the exhaust manifold 102. As described in detail below, the scavenged steam is condensed, filtered, and recycled to the water tank 116 for reuse. The cycle illustrated in FIGS. 11–14 is then repeated to continuously drive the crankshaft 30 to thereby power the engine 10. It will be appreciated that the steam powered strokes can only occur after the chambers 78,80 are sufficiently hot from internal combustion. In this regard, the steam delivery system 28 is preferably configured to respond to the temperature of the chambers 78,80 both to prevent water injection when the temperature is too low and to optimize engine operating temperatures by varying water injection (e.g., repeating water injection when the temperature is too high). In this manner, during cold start up conditions, there maybe several consecutive fuel powered strokes before the first steam powered stroke. However, it is within the ambit of the present invention to utilize various alternative configurations for the operation of the engine 10. For example, fuel and water could be injected into the chamber during the same stroke to combine to power each stroke. In this regard, the water is preferably injected after combustion has started to drive the piston down (e.g., ninety degrees of crankshaft rotation, etc.) and the intake valve is preferably eliminated. However, it is important that the engine 10 be powered on every stroke and that the engine be operable to be powered by both internal combustion and steam.

As indicated above, the engine 10 is operable to collect the steam that is scavenged out of the variable displacement chambers 78,80 and condense, filter, and recycle the steam to the water tank 116 for reuse. In the illustrated engine 10, the temperature regulation assembly 32 provides these recycling functions as well as cooperates with the cooling function provided by the steam delivery system 28 detailed above to regulate the temperature within the engine 10. Because the engine 10 utilizes steam power and thus requires a fresh supply of water, the engine 10 does not use a conventional antifreeze/radiator system. However, because the water in the engine 10 must not freeze (i.e., freezing undesirably damages the engine components) regardless if the engine 10 is in operation or not, it is important for the temperature regulation assembly 32 to closely maintain the temperature in the engine above thirty-two degrees Fahrenheit at all times. Returning to FIGS. 1–3 as well as FIG. 10, the illustrated temperature regulation assembly 32 broadly includes an insulated encasement 130, a lubrication subassembly 132, and a condenser-radiator subassembly 134.

The insulated encasement 130 encases the engine block 12 and the adjacent temperature-sensitive engine components, particularly including the water tank 116, and insulates the enclosed components from the ambient atmospheric temperature. Particularly, the illustrated encasement 130 includes a pair of spaced apart side panels 136 and 138, opposed front and back panels 140 and 142, and opposed top and bottom panels 144 and 146 (see FIGS. 1–3 and 10). The side panels 136,138 are generally parallel panels that engage and extend along the sides of the engine block 12 and mirror the shape thereof as shown in FIG. 3. The ends of the crankshaft 30 extend out of the respective side panels 136,138. In a similar manner, the front panel 140 engages and extends along the front of the engine block 12 mirroring the shape thereof. The back panel 142 is spaced from the back of the engine block 12 to provide sufficient space for the water tank 116, as well as most of the components of the lubrication subassembly 132 detailed below. The top panel 144 engages and extends along the cylinder head 46 and closes the panels 136,138,140,142. In a similar manner, the bottom panel 146 engages and extends along the oil sump 42 and closes the panels at the bottom end. The engine block 12 is preferably angled at forty-five degrees relative to the bottom panel 146 to facilitate heating the inside of the encasement 130 as detailed below.

Each of the panels 136,138,140,142,144,146 are preferably formed of a material that is durable and possesses a relatively high thermal insulating rating. The illustrated panels are preferably substantially formed of a glass reinforced plastic, such as a hardened resin embedded with glass fibers. One suitable material is available from Owens Corning under the designation StaMax® P. However, the encasement 130 could be formed out of any suitable synthetic resin or fibrous composite material having the desired durability and insulating capabilities. The encasement 130 is generally closed with the exception of certain components extending there through, such as the intake and exhaust manifold pipes. In this manner, the encasement 130 forms an enclosed environment that can be thermally regulated. In this regard, located within the encasement 130 is a pair of heaters 148 and 150 operable to maintain the temperature within the encasement 130 above freezing at all times (see FIG. 1). The illustrated heater 148 is preferably an electric heater that can be powered by the engine 10 and powered by an external source (e.g., plugged into an electrical outlet, etc.). The heater 148 could additionally be powered by a rechargeable power supply, such as a battery that can be recharged by the engine 10 and/or recharged by an external power source. The illustrated heater 150 is preferably a fuel powered heater powered independently of the engine 10 by a refillable fuel supply, such as kerosene, etc. In this manner, one of the heaters 148,150 is always operable to maintain the temperature within the encasement 130 whether the engine 10 is in operation or not. The heaters 148,150 are preferably controlled by a thermostat that selectively activates the heaters 148,150 to maintain the temperature within the encasement 130 above freezing. In addition, the heaters 148,150 are preferably configured to warm up the components within the encasement 30 to prevent cold start ups of the engine 10.

The lubrication subassembly 132 lubricates the engine components within the engine block 12 to reduce friction and thus reduce heat during operation of the engine 10. The illustrated lubrication subassembly broadly includes an oil tank 152, an oil pump (not shown), an oil cooler 154, the oil sump 42, and the oil galleries 60 and 76. In order to facilitate a compact configuration for the engine 10 and to facilitate preventing the engine components from freezing, in one manner known in the art, the illustrated lubrication assembly 132 is a dry sump constant pressure oiling system. In particular, the oil pump is a duplex pump, including a pump that pumps used oil through supply lines (not shown) from the sump 42 to the oil cooler 154 and then to the oil tank 152 for storage. The duplex pump includes a second pump that pumps oil from the tank 152 through the crankcase 34, the cylinder chamber 14b and the galleries 60,76. In one manner known in the art, the galleries 60,76 are preferably configured to oil the components within the upper cylinder chamber 14a (i.e., the components that are sealed off above the cylinder foot 48) with a metered amount of oil, for example, a set amount of oil for every rotation of the crankshaft 30.

The condenser-radiator subassembly 134 collects the steam that is scavenged out of the variable displacement chambers 78,80 and condenses, filters, and recycles the water to the water tank 116 for reuse. The illustrated condenser-radiator subassembly 134 broadly includes a condenser-radiator 156, an air louver 158, a fan 160, an air dam 162, and a thermostat 164. In more detail, and as shown in FIGS. 1–3, the condenser-radiator 156 is in fluid communication with the exhaust manifold 102 and is positioned in front of the engine block 12 and adjacent the front of the vehicle V. The condenser-radiator 156 is similar to a conventional radiator in that it includes a plurality of ducts presenting a relatively large surface area over which cool air is blown to cool the contents in the ducts (see FIG. 3). The steam and spent gases scavenged from the cylinder 14 are routed through the exhaust manifold 102 into the duct work of the condenser-radiator 156. The cooling air is provided by the air louver 158 and/or the fan 160. When the vehicle V is traveling in a forward direction and moving fast enough, sufficient air is forced through the louver 158 to condense the steam in the condenser-radiator 156. The air dam 162 is positioned adjacent the louver 158 to force more air through the louver 158 as the vehicle V travels forward. The thermostat 164 (see FIG. 3) opens and closes the louver 158 to prevent freezing of any condensed water in the condenser-radiator 156. When the vehicle V is not traveling forward fast enough to force sufficient air through the louver 158, the cooling air is provided by the fan 160. The illustrated fan 160 is an electric fan that is controlled by a sail switch 166 that is configured to control the fan 160 in response to the rate of forward travel of the vehicle V.

The steam in the condenser-radiator 156 is condensed to water and the relative weight of the water separates it from the spent gases that are not condensed. The spent gases are exhausted through the outlet pipe 114 and can be filtered and/or treated in a downstream muffler and/or converter (not shown). The condensed water is filtered in the condenser-radiator 156 and recirculated to the water tank 116 through the supply line 168. The condenser-radiator 156 preferably is configured to neutralize the condensed water prior to recirculation, for example by adding a base (e.g., soda, etc.) to the water. Excess water in the storage tank 116 is drained to the ground by a drain hose 170. It is believed the condenser-radiator 156 recycles a sufficient amount of water to enable the steam delivery system 28 to be self-sustaining. That is to say, a natural byproduct of the combustion of hydrocarbon diesel fuel is water. In the illustrated engine 10, this water is collected, condensed, filtered, neutralized, and reused in the steam deliver system 28.

As previously indicated, the cylinders 16,18 and the corresponding pistons 22,24 are configured similarly to the cylinder 14 and piston 20 described in detail above. In this regard, and as diagramed in FIG. 16, the three pistons 20,22,24 are timed to cooperate to rotate the crankshaft 30 and thereby power the engine 10. As shown in FIG. 16, each of the pistons 20,22,24 preferably complete one entire cycle, as described above, for every two revolutions of the crankshaft 30. That is to say, each of the pistons 20,22,24 completes a fuel powered down stroke, a fuel powered up stroke, a steam powered down stroke, and a steam powered up stroke for every two rotations of the crankshaft 30. The pistons 20,22,24 are preferably timed so that the power strokes for the piston 22 are initiated sixty degrees of crankshaft rotation after the power strokes initiate for the piston 20 and similarly, the power strokes for the piston 24 are initiated sixty degrees of crankshaft rotation after the power strokes initiate for the piston 22. The engine 10 is timed in any suitable manner known in the art, for example a timing belt (not shown) that drives a series of geared sprockets and is driven by a master sprocket 172 (see FIG. 3) coupled to the crankshaft 30. It is believed that the illustrated engine 10 operated in the preferred manner as described will satisfy the EPA's Tier 2 restrictions that will be phased in beginning in 2004, with full compliance required by 2009. However, it is within the ambit of the present invention to utilize various alternative configurations for the engine 10, for example, the number and timing of the pistons can be varied. However, it is important that the engine include at least one double-acting piston that is powered through every stroke and is operable to powered by internal combustion and steam.

The illustrated engine 10 powers the automobile V and therefore is drivingly coupled to various conventional automotive components such as transmission 174 and an alternator 176 (see FIG. 3). However, as indicated above, the engine 10 could be used to power various applications and thus could be drivingly coupled to virtually any driven components.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of the present invention as pertains to any apparatus not materially departing from but outside the literal scope of the invention as set forth in the following claims.

What is claimed is:

1. An engine comprising:
a cylinder;
a piston slidably received in the cylinder and shiftable in opposite first and second directions;
a first power source operable to alternately shift the piston in the first and second directions,
said first power source including a combustible organic fuel and means for combusting the organic fuel inside the cylinder; and
a second power source operable to alternately shift the piston in the first and second directions,
said second power source including a noncombustible inorganic material and means for expanding the material inside the cylinder, said cylinder including a cylinder head and a cylinder foot spaced from the cylinder head, each being operable to generally seal the cylinder,
said cylinder presenting internal spaced apart first and second chambers defined between the cylinder head and foot,
said piston including a piston head,
said piston shiftable between a first position wherein the piston head is located in the first chamber and a second position wherein the piston head is located in the second chamber,
said first power source including a first injector operable to inject said combustible organic fuel into said first chamber,
said first power source being operable to shift the piston from the first position to the second position.

2. The engine as claimed in claim 1,
said cylinder power source including a second injector operable to injector said noncombustible inorganic material into said second chamber,
said second power source being operable to shift the piston from the second position to the first position.

3. The engine as claimed in claim 1, said noncombustible inorganic material being water.

4. The engine as claimed in claim 3,
said second power source including an injector operable to inject ssaid water into said first chamber,
said means for expanding the water inside the cylinder including heating the first chamber by said combusting the organic fuel inside the cylinder and injecting said water into the heated first chamber to thereby convert said water into steam.

5. The engine as claimed in claim 1;
a storage tank in fluid communication with the cylinder and being operable to store the inorganic material for delivery to the cylinder; and
an insulated box incasing the cylinder, the piston, and the storage tank,
said box being formed in major portion of resin.

6. The engine as claimed in claim 5, said box encasing substantially the intire engine.

7. The engine as claimed in claim 1; and
a rotatable crankshaft,
said piston including a piston rod extending at least partially through said cylinder foot and being in driving communication with said crankshaft.

8. The engine as claimed in claim 7; and
an oil gallery operable to supply a metered amount of oil to said crankshaft for each rotation thereof,
least a portion of said gallery being disposed within said piston and at least an additional portion of said gallery being disposed within said cylinder.

9. The engine as claimed in claim 7; and
at least a pair of piston rod rings received between the cylinder foot and the piston rod and being operable to create a seal therebetween,
said rings each being generally semicircular in configuration.

10. An engine comprising:
a cylinder;
a piston slidably received in the cylinder and shiftable in onposite first and second directions;
a first vower source operable to alternately shift the piston in the first and second directions,
said first power source including a combustible organic fuel and means for combusting the organic fuel inside the cylinder; and
a second power source operable to alternately shift the piston in the first and second direction,
said second vower source including a noncombustible inorganic material and means for expanding the material inside the cylinder,
said cylinder including a cylinder head and a cylinder foot spaced from the cylinder head, each being operable to generally seal the cylinder,
said cylinder presenting internal spaced apart first and second chambers defined between the cylinder head and foot,
said piston including a piston head,
said piston shiftable between a first position wherein the piston head is located in the first chamber and a second position wherein the piston head is located in the second chamber,
said first power source including a first injector operable to inject said combustible organic fuel into said first chamber,
said second power source including a second injector operable to inject said noncombustible inorganic material into said first chamber, said first and second power sources cooperating to shift the piston from the first position to the second position.

11. An engine comprising:

a cylinder;

a piston slidably received in the cylinder and shiftable in opposite first and second directions;

a first power source operable to alternately shift the piston in the first and second directions, said first power source including a combustible organic fuel and means for combusting the organic fuel inside the cylinder; and a second power source operable to alternately shift the piston in the first and second directions, said second power source including a noncombustible inorganic material and means for expanding the material inside the cylinder, said noncombustible inorganic material being water, said combustible organic fuel being diesel fuel.

12. The engine as claimed in claim 11; and a condenser in fluid communication with the cylinder and being operable to collect substantially all gases exhausted from the cylinder, said condenser including a fan operable to cool the gases sufficiently to convert any steam collected back into water.

13. The engine as claimed in claim 12, said fan including a sail switch operable to activate the fan in response to the relevant speed of ambient air flow adjacent the switch.

14. The engine as claimed in claim 12, said condenser further including a filter operable to generally filter impurities from the converted water, said filter including a neutralizer operable to add a base to the converted water sufficient to neutralize the converted water.

15. An engine comprising:

a cylinder;

a piston slidably received in the cylinder and shiftable in opposite first and second directions;

a first power source operable to alternately shift the piston in the first and second directions, said first power source including a combustible organic fuel and means for combusting the organic fuel inside the cylinder; and a second power source operable to alternately shift the piston in the first and second directions, said second power source including a noncombustible inorganic material and means for expanding the material inside the cylinder, said noncombustible inorganic material being water, said second power source including an injector operable to inject said water into said first chamber; and an insulated storage tank in fluid communication with said injector and being operable to store the water for delivery to said injector.

16. The engine as claimed in claim 15, said storage tank including a temperature control element operable to maintain the temperature of the water stored therein to prevent the water from freezing and boiling.

17. In a powered vehicle, an engine for powering the vehicle, said engine comprising:

a cylinder;

a piston slidably received in the cylinder and shiftable in opposite first and second directions;

a first power source operable to alternately shift the piston in the first and second directions, said first power source including a combustible organic fuel and means for combusting the organic fuel inside the cylinder; and a second power source operable to alternately shift the piston in the first and second directions, said second power source including a noncombustible inorganic material and means for expanding the material inside the cylinder, said cylinder including a cylinder head and a cylinder foot spaced from the cylinder head, each being operable to generally seal the cylinder, said cylinder presenting internal spaced apart first and second chambers defined between the cylinder head and foot, said piston including a piston head, said piston shiftable between a first position wherein the piston head is located in the first chamber and a second position wherein the piston head is located in the second chamber, said first power source including a first injector operable to inject said combustible organic fuel into said first chamber, said first power source being operable to shift the piston from the first position to the second position.

18. In the powered vehicle as claimed in claim 17, said second power source including a second injector operable to inject said noncombustible inorganic material into said second chamber, said second power source being operable to shift the piston from the second position to the first position.

19. In the powered vehicle as claimed in claim 17, said noncombustible inorganic material being water.

20. In a powered vehicle, an engine for powering the vehicle, said engine comprising:

a cylinder;

a piston slidably received in the cylinder and shiftable in opposite first and second directions;

a first power source operable to alternately shift the piston in the first and second directions, said first power source including a combustible organic fuel and means for combusting the organic fuel inside the cylinder; and a second power source operable to alternately shift the piston in the first and second directions, said second power source including a noncombustible inorganic material and means for expanding the material inside the cylinder, said cylinder including a cylinder head and a cylinder foot spaced from the cylinder head, each being operable to generally seal the cylinder, said cylinder presenting internal spaced apart first and second chambers defined between the cylinder head and foot, said piston including a piston head, said piston shiftable between a first position wherein the piston head is located in the first chamber and a second position wherein the piston head is located in the second chamber, said first power source including a first injector operable to inject said combustible organic fuel into said first chamber, said second power source including a second injector operable to inject said noncombustible inorganic material into said first chamber, said first and second power sources cooperating to shift the piston from the first position to the second position.

21. In a powered vehicle, an engine for powering the vehicle, said engine comprising:

a cylinder;

a piston slidably received in the cylinder and shiftable in opposite first and second directions;

a first power source operable to alternately shift the piston in the first and second directions, said first power source including a combustible organic fuel and means for combusting the organic fuel inside the cylinder; and a second power source operable to alternately shift the piston in the first and second directions, said second power source including a noncombustible inorganic material and means for expanding the material inside the cylinder, said noncombustible inorganic material being water, said combustible organic fuel being diesel fuel.

22. In the powered vehicle as claimed in claim 21; and a condenser in fluid communication with the cylinder and being operable to collect substantially all gases exhausted from the cylinder, said condenser including a fan operable to cool the gases sufficiently to convert any steam collected back into water.

23. In the powered vehicle as claimed in claim 22, said fan including a sail switch operable to activate the fan in response to the relevant speed of ambient air flow adjacent the switch.

24. In the powered vehicle as claimed in claim 22, said condenser further including a filter operable to generally filter impurities from the converted water, said filter including a neutralizer operable to add a base to the converted water sufficient to neutralize the converted water.

25. In a powered vehicle, an engine for powering the vehicle, said engine comprising:

a cylinder;

a piston slidably received in the cylinder and shiftable in opposite first and second directions;

a first power source operable to alternately shift the piston in the first and second directions, said first power source including a combustible organic fuel and means for combusting the organic fuel inside the cylinder; and a second power source operable to alternately shift the piston in the first and second directions, said second power source including a noncombustible inorganic material and means for expanding the material inside the cylinder, said noncombustible inorganic material being water, said second power source including an injector operable to inject said water into said first chamber; and an insulated storage tank in fluid communication with said injector and being operable to store the water for delivery to said injector.

26. In the powered vehicle as claimed in claim 25, said storage tank including a temperature control element operable to maintain the temperature of the water stored therein to prevent the water from freezing and boiling.

27. An engine comprising:

a cylinder;

a piston slidably received in the cylinder and shiftable in opposite first and second directions;

a first power source operable to alternately shift the piston in the first and second directions, said first power source including a combustible organic fuel and means for combusting the organic fuel inside the cylinder;

a second power source operable to alternately shift the piston in the first and second directions, said second power source including a noncombustible inorganic material and means for expanding the material inside the cylinder;

a storage tank in fluid communication with the cylinder and being operable to store the inorganic material for delivery to the cylinder;

an insulated box encasing the cylinder, the piston, and the storage tank, said box being formed in major portion of resin, said cylinder including a cylinder head and a cylinder foot spaced from the cylinder head, each being operable to generally seal the cylinder, said cylinder presenting internal spaced apart first and second chambers defined between the cylinder head and foot, said piston including a piston head, said piston shiftable between a first position wherein the piston head is located in the first chamber and a second position wherein the piston head is located in the second chamber, said first power source including a first injector operable to inject said combustible organic fuel into said first chamber, said first power source being operable to shift the piston from the first position to the second position; and a condenser in fluid communication with the cylinder and being operable to collect substantially all gases exhausted from the cylinder, said condenser including a fan operable to cool the gases sufficiently to convert any steam collected back into water, said fan including a sail switch operable to activate the fan in response to the relevant speed of ambient air flow adjacent the switch, said condenser further including a filter operable to generally filter impurities from the converted water, said filter including a neutralizer operable to add a base to the converted water sufficient to neutralize the converted water.

* * * * *